(12) United States Patent
Qiu

(10) Patent No.: US 10,346,153 B2
(45) Date of Patent: Jul. 9, 2019

(54) METHOD AND DEVICE FOR REPLACING AN APPLICATION INTERFACE OF AN ELECTRONIC CIGARETTE AND ELECTRONIC CIGARETTE THEREWITH

(71) Applicant: Joyetech Europe Holding GmbH, Zug (CH)

(72) Inventor: Weihua Qiu, Jiangsu (CN)

(73) Assignee: JOYETECH EUROPE HOLDING GMBH, Zug (CH)

( * ) Notice: Subject to any disclaimer, the term of this patent is extended or adjusted under 35 U.S.C. 154(b) by 38 days.

(21) Appl. No.: 15/634,293

(22) Filed: Jun. 27, 2017

(65) Prior Publication Data
US 2018/0011701 A1    Jan. 11, 2018

(30) Foreign Application Priority Data

Jul. 8, 2016   (CN) .......................... 2016 1 0537476

(51) Int. Cl.
*G06F 8/65*       (2018.01)
*A24F 47/00*    (2006.01)
(Continued)

(52) U.S. Cl.
CPC ............. *G06F 8/65* (2013.01); *A24F 47/008* (2013.01); *H04L 67/10* (2013.01); *G06F 9/451* (2018.02); *H04L 67/12* (2013.01)

(58) Field of Classification Search
CPC ..... G06F 8/60; G06F 8/61; G06F 8/65; G06F 9/451; H04L 67/10; H04L 67/12; A24F 47/008
(Continued)

(56) References Cited

U.S. PATENT DOCUMENTS 9,536,296 B2 * 1/2017 Peleg ..................... G01N 25/72
9,743,691 B2 * 8/2017 Minskoff ............. A24F 47/008
(Continued)

OTHER PUBLICATIONS

Andrew Figgs," Customize your Cuboid! A Step-By-Step Guide", Apr. 29, 2016, Mt Backer Vapor, total pages 12, retrieved from <http://blog.mtbakervapor.corn/customize-cuboid-step-step-guide/> (Year: 2016).*

*Primary Examiner* — Marina Lee
(74) *Attorney, Agent, or Firm* — Novick, Kim & Lee, PLLC; Allen Xue

(57) ABSTRACT

A method for replacing an application interface of an electronic cigarette includes the steps of receiving a mode switching request after starting up a system, and displaying a network configuration interface based on the received mode switching request; acquiring a network address of a server when the electronic cigarette is connected to a network, and accessing the server based on the acquired network address of the server automatically; sending a request for downloading interface information to the server, and receiving the interface information from the server based on the request for downloading interface information; and replacing the application interface of the electronic cigarette with the interface information when receiving a request for replacing the application interface of the electronic cigarette. A device for replacing an application interface of an electronic cigarette and an electronic cigarette are also disclosed. With the method, the device and the electronic cigarette, the application interface of the electronic cigarette can be personalized when required.

18 Claims, 7 Drawing Sheets

(51) Int. Cl.
*G06F 9/451* (2018.01)
*H04L 29/08* (2006.01)

(58) Field of Classification Search
USPC .......................................... 717/121, 168–178
See application file for complete search history.

(56) References Cited

U.S. PATENT DOCUMENTS

| | | | |
|---|---|---|---|
| 10,039,327 B2* | 8/2018 | Cameron | A24F 47/008 |
| 10,058,128 B2* | 8/2018 | Cameron | A24F 47/008 |
| 2013/0340775 A1* | 12/2013 | Juster | H04L 67/42 |
| | | | 131/273 |
| 2014/0202474 A1* | 7/2014 | Peleg | G01N 25/72 |
| | | | 131/328 |
| 2015/0181945 A1* | 7/2015 | Tremblay | A24F 47/008 |
| | | | 131/328 |
| 2016/0081393 A1* | 3/2016 | Black | A24F 47/008 |
| | | | 392/387 |
| 2016/0331035 A1* | 11/2016 | Cameron | F01K 5/00 |
| 2016/0363917 A1* | 12/2016 | Blackley | G05B 19/042 |
| 2017/0020188 A1* | 1/2017 | Cameron | H04L 67/025 |
| 2018/0011701 A1* | 1/2018 | Qiu | A24F 47/008 |

* cited by examiner

METHOD AND DEVICE FOR REPLACING AN APPLICATION INTERFACE OF AN ELECTRONIC CIGARETTE AND ELECTRONIC CIGARETTE THEREWITH

TECHNICAL FIELD

The present disclosure relates to the technical field of smoking simulation, and more particularly, to a method and a device for replacing an application interface of an electronic cigarette and an electronic cigarette therewith.

BACKGROUND

As a substitute of tobacco products, the electronic cigarette becomes more and more popular in the market at present, due to its characteristics of being convenient to carry and capable of creating a large amount of smoke. Generally, when a user is using the electronic cigarette for smoking, a flow of air may be generated, and the flow of air may be detected by a sensor, so that a heating device may be activated to gasify the tobacco liquid provided inside the device. The traditional electronic cigarette generally includes a LED lamp cover, a battery, an atomizer and a smoke cartridge. In some types of the electronic cigarettes, the smoke cartridge and the atomizer are combined together. There are various kinds of electronic cigarettes in production and marketing. However, with the advent of technology, the demand for the electronic cigarette is also increasing. In addition to the basic smoking function, the electronic cigarette needs to have a human-machine interactive capacity to improve the intelligent level of the electronic cigarette. When a user is using the electronic cigarette for smoking, the user would have a great entertainment experience through human machine interaction.

However, the increased intellectualized design will continue to increase the cost of development of the electronic cigarette. In addition, there are various kinds of intellectual products available for users at present, and these intellectual products have their respective advantages. The entertainment of the electronic cigarette does not replace the advantages of other electronics, such as smart phones, or tablet computers, but pays attention to enhancing user experience and considering user's actual needs. The intelligent level of the existing electronic cigarette cannot meet current user requirements, and cannot implement a personalized interface, so it cannot reflect the entertainment and enjoyment of the electronic cigarette effectively.

SUMMARY

An objective of the present disclosure is to provide a method and a device for replacing an application interface of an electronic cigarette and an electronic cigarette therewith, with which the application interface of the electronic cigarette can be personalized as required.

According to an aspect of the present disclosure, a method for replacing an application interface of an electronic cigarette is provided, including: receiving a mode switching request after starting up a system, and displaying a network configuration interface based on the received mode switching request; acquiring a network address of a server when the electronic cigarette is connected to a network, and accessing the server based on the acquired network address of the server automatically; sending a request for downloading interface information to the server, and receiving the interface information from the server based on the request for downloading interface information; and replacing the application interface of the electronic cigarette with the interface information when receiving a request for replacing the application interface of the electronic cigarette.

Further, the sending the request for downloading interface information to the server includes:
determining whether a request for drawing the interface information is received;
displaying an interface for drawing the interface information, and controlling a tool for drawing the interface information to draw the interface information on the interface for drawing the interface information, if the request for drawing the interface information is received; and
displaying a download interface for the interface information provided by the server, and sending the request for downloading interface information to the server, if the request for drawing the interface information is not received.

Further, the method further includes:
replacing the application interface of the electronic cigarette with the drawn interface information when receiving the request for replacing the application interface of the electronic cigarette.

Further, the controlling the tool for drawing the interface information to draw the interface information on the interface for drawing the interface information includes:
storing the drawn interface information into a memory of the electronic cigarette; or
uploading the drawn interface information to the server for storing.

Further, the method further includes:
receiving a request for acquiring local interface information, and displaying an interface about the local interface information based on the received request for acquiring the local interface information;
selecting the local interface information; and
replacing an mode interface of the electronic cigarette with the selected local interface information.

Further, the interface information includes images, backgrounds and subjects.

According to another aspect of the present disclosure, a device for replacing an application interface of an electronic cigarette is provided, including a switching module, a connecting module, a download module, and a replacing module; the switching module is configured to receive a mode switching request after starting up a system, and display a network configuration interface based on the received mode switching request; the connecting module is configured to acquire a network address of a server when the electronic cigarette is connected to a network, and access the server based on the acquired network address of the server automatically; the download module is configured to send a request for downloading interface information to the server, and receive the interface information from the server based on the request for downloading interface information; and the replacing module is configured to replace the application interface of the electronic cigarette with the interface information when receiving a request for replacing the application interface of the electronic cigarette.

Further, the device further includes a drawing determination module and a drawing module, wherein the drawing determination module is configured to determine whether a request for drawing the interface information is received; the drawing module is configured to display an interface for drawing the interface information, and control a tool for drawing the interface information to draw the interface information on the interface for drawing the interface information, if the request for drawing the interface information is received; and the download module is further configured to display a download interface for the interface information provided by the server, and send the request for downloading interface information to the server, if the request for drawing the interface information is not received.

Further, the replacing module is further configured to replace the application interface of the electronic cigarette with the drawn interface information when receiving the request for replacing the application interface of the electronic cigarette.

Further, the drawing module is further configured to store the drawn interface information into a memory of the electronic cigarette, or upload the drawn interface information to the server for storing.

Further, the device further includes an acquiring module and a selecting module, wherein the acquiring module is configured to receive a request for acquiring local interface information, and display an interface about the local interface information based on the received request for acquiring the local interface information; the selecting module is configured to select the local interface information; and the replacing module is further configured to replay an mode interface of the electronic cigarette with the selected local interface information.

Further, the interface information includes images, backgrounds and subjects.

According to a further aspect of the present disclosure, an electronic cigarette is provided, including the above device for replacing the application interface of the electronic cigarette.

The technical solutions proposed in the present disclosure have the following beneficial effects. By receiving a mode switching request, displaying a network configuration interface based on the received mode switching request, acquiring a network address of a server when the electronic cigarette is connected to a network, accessing the server based on the acquired network address of the server automatically, sending a request for downloading interface information to the server, receiving the interface information from the server based on the request for downloading interface information, and replacing the application interface of the electronic cigarette with the interface information when receiving a request for replacing the application interface of the electronic cigarette, the application interface of the electronic cigarette can be personalized as required, so as to achieve the entertainment and enjoyment of the electronic cigarette better, to meet user needs.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF PREFERRED EMBODIMENTS

The advantages and features of the present disclosure will become apparent by referring to embodiments of the present disclosure as described below in detail in conjunction with the accompanying drawings. However, the present disclosure is not limited to the embodiments set forth below, but may be implemented in various different forms, as one of ordinary skill in the art would know. The following embodiments are provided only to inform those skilled in the art of the scope of the present disclosure, and the present disclosure is limited only by the scope of the appended claims.

Example One

Figure 1:
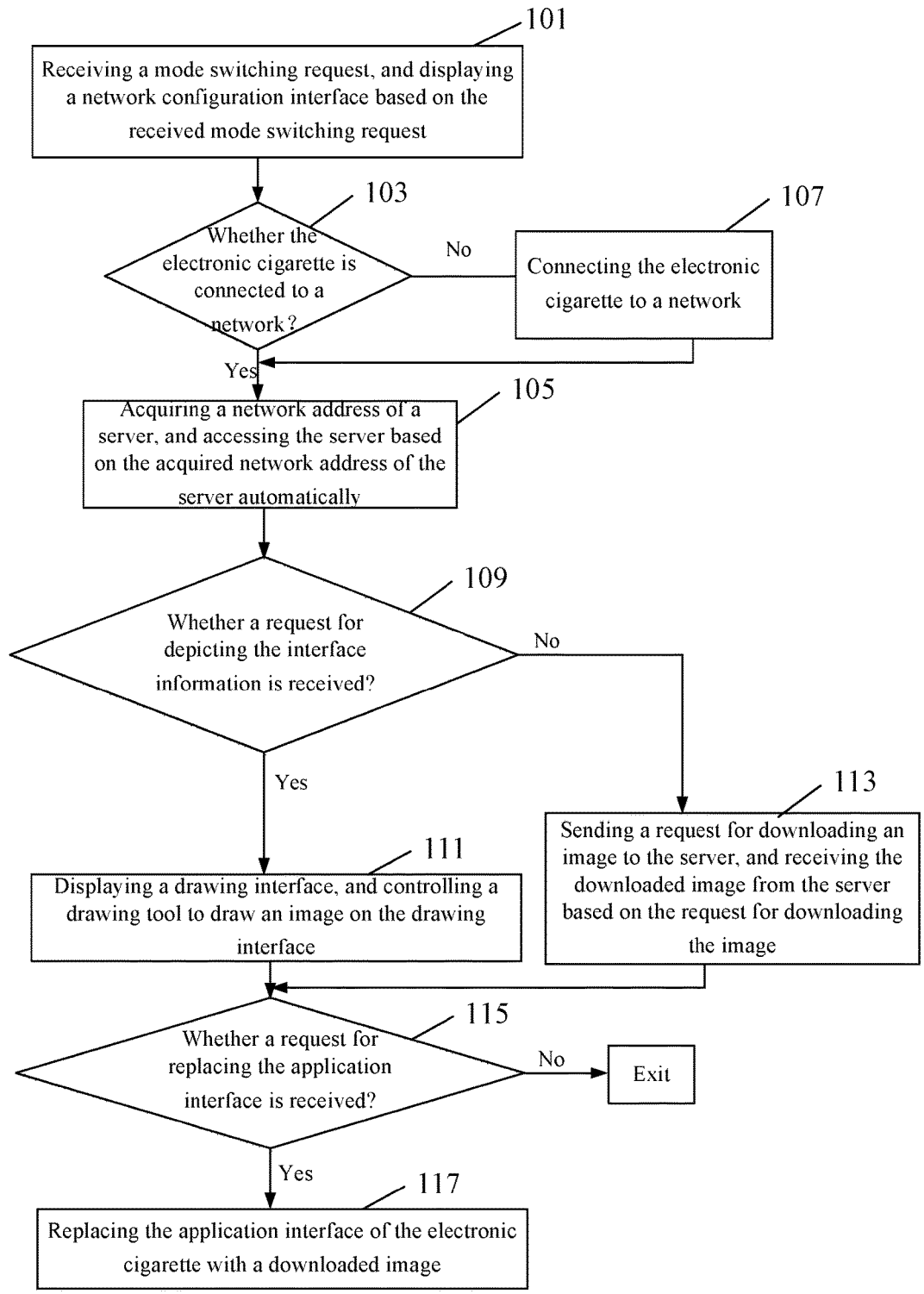
FIG. 1 is a flow diagram illustrating a method for replacing an application interface of an electronic cigarette according to Example One of the present disclosure.

FIG. 1 is a flow diagram illustrating a method for replacing an application interface of an electronic cigarette according to Example One of the present disclosure. The method for replacing the application interface of the electronic cigarette can personalize the application interface of the electronic cigarette as required. With reference to FIG. 1, in this example, the method for replacing the application interface of the electronic cigarette may include the following Steps 101-117.

Step 101, receiving a mode switching request after starting up a system, and displaying a network configuration interface based on the received mode switching request.

When the electronic cigarette is powered on and started up, the device for replacing the application interface of the electronic cigarette may receive a mode switching request. For example, whether a mode switching request is received may be determined by determining whether there are N times when a key signal is input. If there are N times when the key signal is input, it is determined that the mode switching request is received, otherwise, it is determined that no mode switching request is received. For example, when the ignition key on the electronic cigarette has been pressed continuously for three times, it means issuing a request for executing mode switching.

Preferably, the method may further include Step 103.

Step 103, determining whether the electronic cigarette is connected to a network.

The network configuration interface may show a network connection state identifier. When the network connection state identifier is gray, it means the electronic cigarette is not connected to a network, and when the network connection state identifier is green, it means the electronic cigarette is connected to a network. In this way, the network connection state of the electronic cigarette, for example, a networked state or a non-networked state may be known by detecting the network connection state identifier in the network configuration interface.

Step 105, acquiring a network address of a server when the electronic cigarette is connected to a network, and accessing the server based on the acquired network address of the server automatically.

The server may be a specified server. If the electronic cigarette is connected to the server, the device for replacing the application interface of the electronic cigarette may receive an upload request sent by the user, and upload the drawn interface information, such as images, subjects and backgrounds to the server based on the upload request. The device for replacing the application interface of the electronic cigarette may also download interface information from the server. The downloaded interface information may be stored into a memory of the electronic cigarette, or used to replace the application interface of the electronic cigarette based on a replacing request sent by the user. The memory may be a secure digital (SD) card, a multimedia card (MMC), a Trans-flash (TF) card or the like.

Preferably, after Step 105, the method may further include Steps 107-111.

Step 107, connecting the electronic cigarette to the network if the electronic cigarette is not connected to the network.

In this step, the acquiring the network address of the server and accessing the server based on the acquired network address of the server automatically in Step 105 may be performed when it is prompted that the electronic cigarette has been connected to the network.

Step 109, determining whether a request for drawing the interface information is received. If so, proceed to Step 111, otherwise, proceed to Step 113.

The received request may be submitted by the user in a corresponding submitting manner. A specific submitting manner may include: clicking, by the user, a key on the electronic cigarette to submit the request for drawing the interface information.

Step 111, displaying an interface for drawing the interface information, and controlling a tool for drawing the interface information to draw the interface information on the interface for drawing the interface information, if the request for drawing the interface information is received.

Various kinds tool for drawing the interface information may be shown on the interface for drawing the interface information, after the interface for drawing the interface information has been displayed. The tool for drawing the interface information may include a brush tool and pigment. The brush tool may be controlled to draw favorite interface information, such as images, by the user. The color of the brush tool (for example, black or white) may be switched by a key arranged on the electronic cigarette, such as an add-subtract key. For example, when the ignition key is pressed for once, an action of drawing a point may be performed, and when the ignition key is pressed for twice, the action of drawing a point may be cancelled.

Preferably, the above step may further include: storing the drawn interface information into the memory of the electronic cigarette or uploading to the server for storing. For example, the user may hold down the ignition key arranged on the electronic cigarette to store the drawn interface information into the memory of the electronic cigarette, or press both the ignition key and the add key arranged on the electronic cigarette to upload the drawn interface information to the server.

Step 113, displaying a download interface for the interface information provided by the server, and sending the request for downloading interface information to the server, if the request for drawing the interface information is not received.

A download interface for the interface information provided by the server may be displayed, after the electronic cigarette has been successfully connected to the server. In this way, the user may browse the recommended interface information provided by the server online. The request for downloading interface information sent to the server may be submitted by pressing a key arranged on the electronic cigarette. For example, the download interface for the interface information may be accessed when the ignition key arranged on the electronic cigarette has been pressed continuously for three times, the recommended interface information may be switched when the add-substract key arranged on the electronic cigarette is pressed, and the recommended interface information may be downloaded and stored in the memory of the electronic cigarette when the ignition key is holded down.

Step 115, determining whether a request for replacing the application interface is received. If so, proceed to Step 117, otherwise, proceed to exit.

Step 117, replacing the application interface of the electronic cigarette with the interface information.

Preferably, Step 117 may further include: replacing the application interface of the electronic cigarette with the interface information sent by the server or the drawn interface information.

Figure 2:
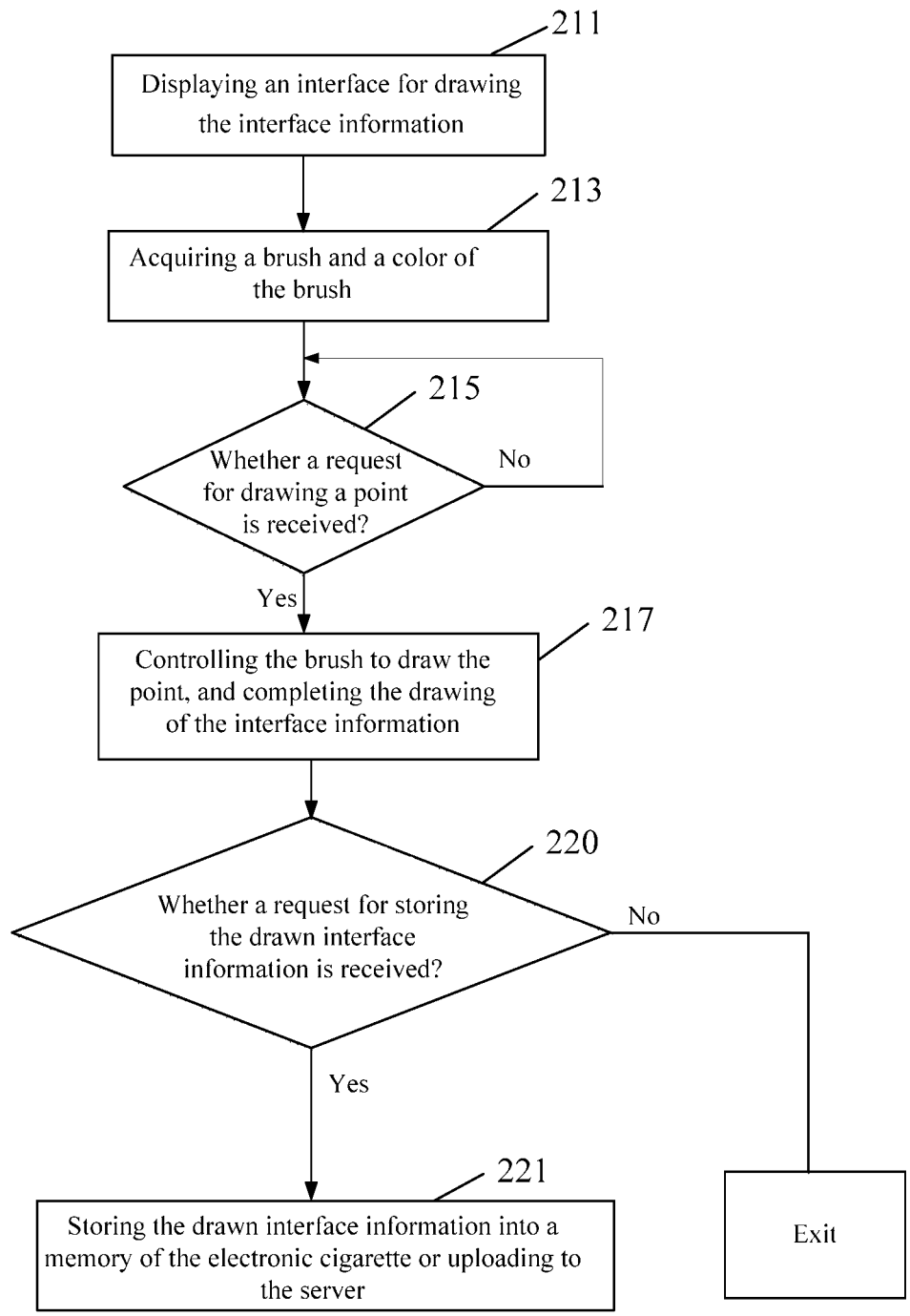
FIG. 2 is a flow diagram illustrating one exemplary embodiment of the method for replacing the application interface of the electronic cigarette in FIG. 1.

Preferably, as shown in FIG. 2, Step 111 may include Step 211-221.

Step 211, displaying an interface for drawing the interface information.

Step 213, acquiring a brush and a color of the brush.

The brush and the color of the brush may be selected in the interface for drawing the interface information. For example, the user may press a key arranged on the electronic cigarette to submit a selection request for selecting a corresponding brush and a corresponding color of the brush. For example, a black brush or a white brush may be selected, and the color of the brush may be changed by pressing the subtract key.

Step 215, determining whether a request for drawing a point is received. If so, proceed to Step 217, otherwise, continue to determine.

Whether a request for drawing a point is received may be determined by determining whether a specified key arranged on the electronic cigarette is pressed. If the specified key is pressed (for example, the ignition key is pressed), it is determined that the request for drawing a point is received, otherwise, it is determined that the request for drawing a point is not received. In addition, the ignition key may be pressed twice to cancel the action of drawing the point.

Step 217, controlling the brush to draw the point, and completing the drawing of the interface information.

Step 220, determining whether a request for storing the drawn interface information is received. If so, proceed to Step 117, otherwise, exit.

The reception of the request for storing the drawn interface information may be determined when the user selects the "save" operation.

Step 221, storing the drawn interface information into the memory of the electronic cigarette.

The drawn interface information may be stored in the memory of the electronic cigarette by holding down the ignition key arranged on the electronic cigarette. The above step may further include: uploading the drawn interface information to the server for storing. For example, the drawn interface information may be uploaded to the server for storing by pressing both the ignition key and the add key.

Figure 3:
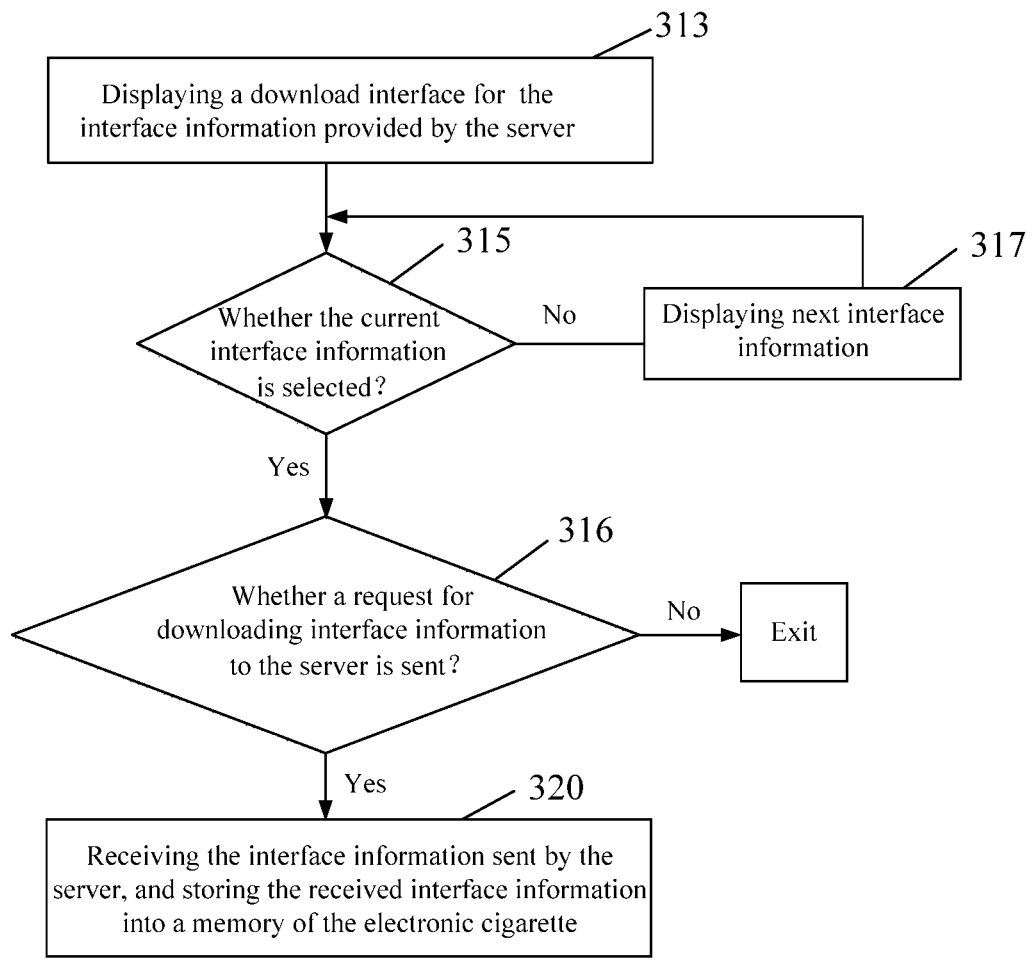
FIG. 3 is a flow diagram illustrating one exemplary embodiment of the method for replacing the application interface of the electronic cigarette in FIG. 1.

Preferably, as shown in FIG. 3, Step 113 may include Steps 313-320.

Step 313, displaying a download interface for the interface information provided by the server.

Step 315, determining whether the current interface information is selected. If so, proceed to Step 316, otherwise proceed to Step 317.

The download interface for the interface information may display many kinds of interface information for selection. If a certain kind of interface information is selected, a selection request may be submitted to the server.

Step 317, displaying next interface information, and proceeding to Step 315.

If the current interface information is not selected, a next interface information can be automatically displayed for selecting.

Step 316, determining whether a request for downloading the interface information to the server is sent. If so proceed to Step 320, otherwise proceed to exit.

Step 320, receiving the interface information sent by the server, and storing the received interface information into the memory of the electronic cigarette.

The method for replacing an application interface of an electronic cigarette in this example at least includes receiving a mode switching request, displaying a network configuration interface based on the received mode switching request, acquiring a network address of a server when the electronic cigarette is connected to a network, accessing the server based on the acquired network address of the server automatically, sending a request for downloading interface information to the server, receiving the interface information from the server based on the request for downloading interface information, and replacing the application interface of the electronic cigarette with the interface information when receiving a request for replacing the application interface of the electronic cigarette. With the method, the application interface of the electronic cigarette can be personalized as required, so as to achieve the entertainment and enjoyment of the electronic cigarette better, to meet user needs.

Example Two

Figure 4:
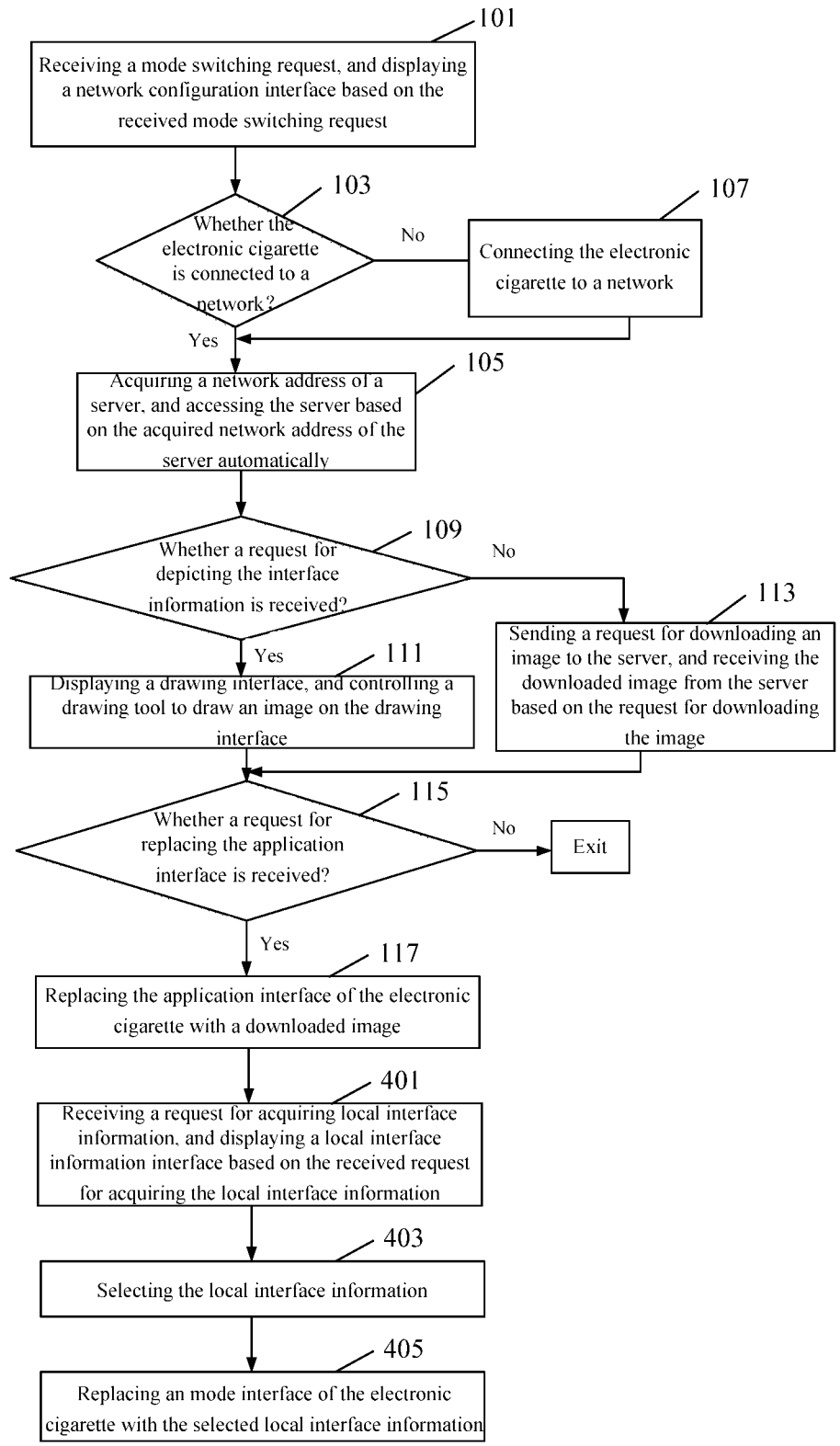
FIG. 4 is a flow diagram illustrating a method for replacing an application interface of an electronic cigarette according to Example Two of the present disclosure.

FIG. 4 is a flow diagram illustrating a method for replacing an application interface of an electronic cigarette according to Example Two of the present disclosure. The method in FIG. 4 is different from the method in FIG. 1 is that the method in FIG. 4 further includes Steps 401-405. Step 401, receiving a request for acquiring local interface information, and displaying a local image interface based on the received request for acquiring the local interface information.

For example, the request for acquiring local interface information may be received when the user is holding down the ignition key, and the local interface information interface may be displayed. The user may press the add key or the subtract key to switch different mode interfaces, such as Temp Ni (Ni mode interface), Temp Ti (Ti mode interface), Temp SS (SS mode interface), TCR, VW, BP and other mode interfaces.

Step 403, selecting the local interface information.

Step 403, replacing the mode interface of the electronic cigarette with the selected local interface information. The local interface information may be browsed by pressing the add key or the subtract key. A successful replacement may be confirmed by holding down the ignition key. The mode interface may be changed by pressing the ignition key, and the changing may exit by pressing the "Exit" key.

Figure 5:
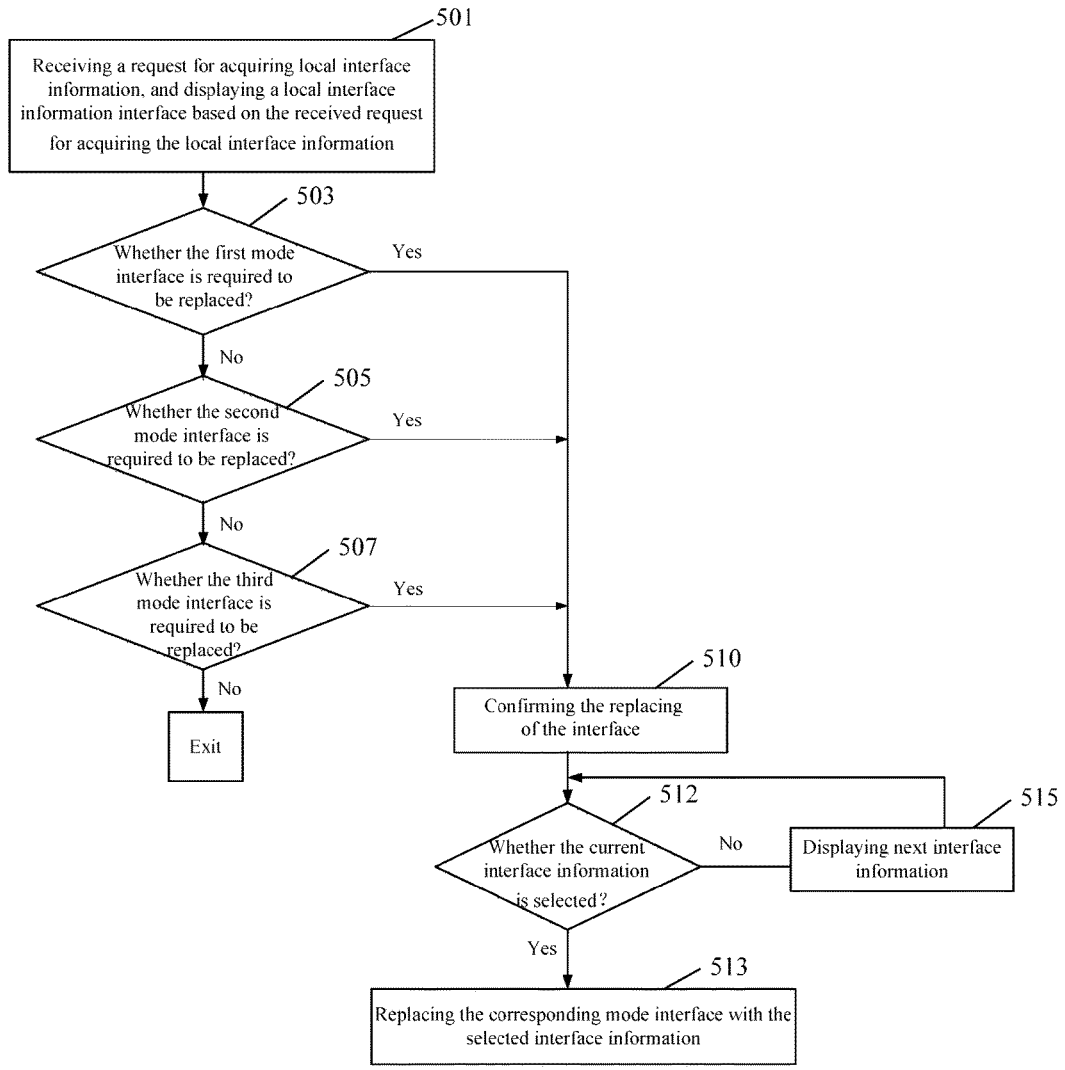
FIG. 5 is a flow diagram illustrating one exemplary embodiment of the method for replacing the application interface of the electronic cigarette in FIG. 4.

Preferably, as shown in FIG. 5, Steps 401-403 may include Steps 501-511.

It is assumed that the mode interface may include Temp Ni (Ni mode interface), Temp Ti (Ti mode interface), and Temp SS (SS mode interface). The mode interface may include other mode interfaces in other embodiments.

Step 501, receiving a request for acquiring local interface information, and displaying local interface information interface based on the received request for acquiring the local interface information.

Step 503, determining whether the first mode interface (for example, Ni mode interface) is required to be replaced. If so, proceed to Step 510, otherwise proceed to Step 505.

For example, the user may press a key arranged on the electronic cigarette when the user want to change the first mode interface.

Step 505, determining whether the second mode interface (for example, Ti mode interface) is required to be replaced. If so, proceed to Step 510, otherwise proceed to Step 507.

For example, the user may press a key arranged on the electronic cigarette when the user want to change the second mode interface.

Step 507, determining whether the third mode interface (for example, SS mode interface) is required to be replaced. If so, proceed to Step 510, otherwise, proceed to exit.

For example, the user may press a key arranged on the electronic cigarette when the user want to change the third mode interface.

Step 510, confirming the replacing of the interface.

For example, the user may press a key arranged on the electronic cigarette (for example, press the ignition key) to confirm the replacing of the interface.

Step 512, determining whether the current interface information is selected. If so, proceed to Step 513, otherwise, proceed to Step 515.

Step 513, replacing the corresponding mode interface with the selected interface informations For example, the user may press the ignition key arranged on the electronic cigarette (for example, hold down the ignition key) to replace the corresponding mode interface.

Step 515, displaying next interface information.

For example, the user may press the add key or subtract key arranged on the electronic cigarette to display the next interface information.

The method for replacing an application interface of an electronic cigarette in this example at least includes receiving a request for acquiring local interface information, and displaying an interface about the local interface information based on the received request for acquiring the local interface information, selecting the local interface information, and replacing an mode interface of the electronic cigarette with the selected local interface information. With this method, the mode interface may be replaced with the local interface information, to further meet user needs.

Embodiments of the device according to the present disclosure are described below. Details not described in the following embodiments can refer to the above corresponding embodiments of the method.

Example Three

Figure 6:
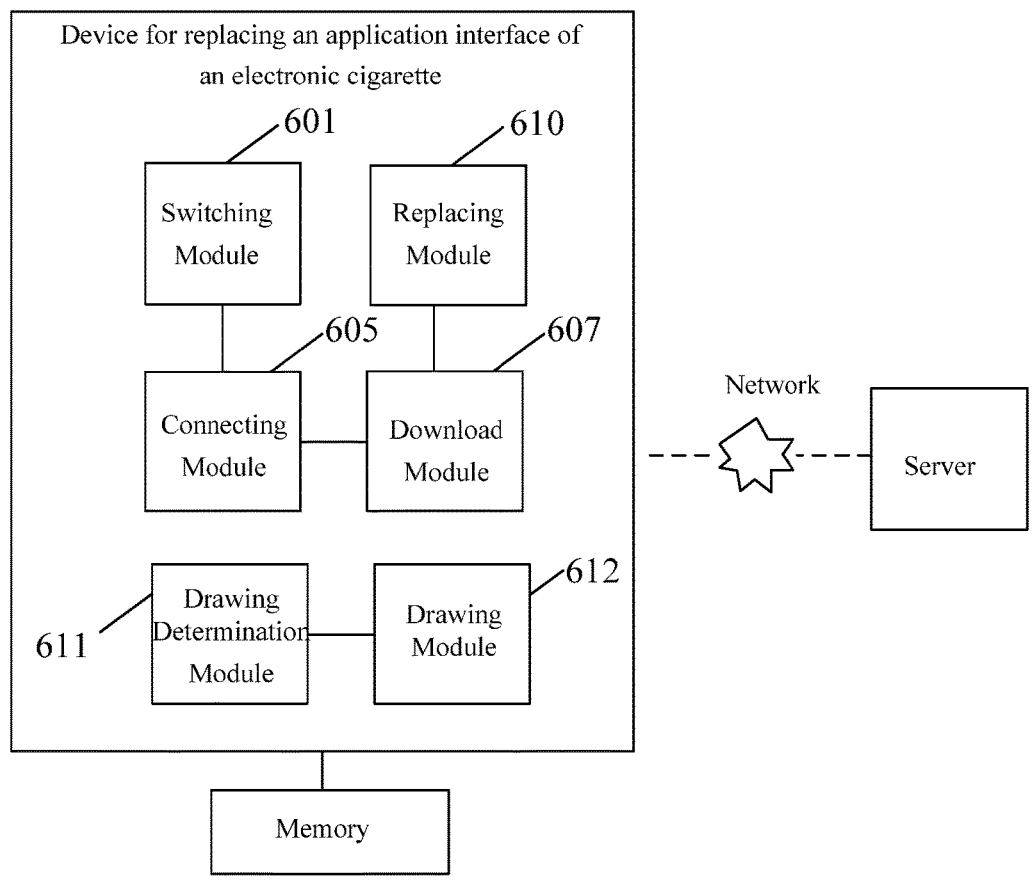
FIG. 6 is a structure diagram illustrating a device for replacing an application interface of an electronic cigarette according to Example Three of the present disclosure.

FIG. 6 is a structure diagram illustrating a device for replacing an application interface of an electronic cigarette according to Example Three of the present disclosure. With reference to FIG. 6, a device for replacing an application interface of an electronic cigarette is provided, including a switching module 601, a connecting module 605, a download module 607, and a replacing module 610. The switching module 601, the network connection determination module 603, the download module 607, the replacing determination module 609 and the replacing module 610 may be provided in the controller of the electronic cigarette.

The switching module 601 is configured to receive a mode switching request after starting up a system, and display a network configuration interface based on the received mode switching request.

The connecting module 605 is configured to acquire a network address of a server when the electronic cigarette is connected to a network, and access the server based on the acquired network address of the server automatically. The controller may communicate with the memory through SDIO. The controller may communicate with the connecting module 605 through SPI bus.

The download module 607 is configured to send a request for downloading interface information to the server, and receive the interface information from the server based on the request for downloading interface information The replacing module 610 is configured to replace the application interface of the electronic cigarette with the interface information when receiving a request for replacing the application interface of the electronic cigarette.

Preferably, the device for replacing an application interface of an electronic cigarette further include a drawing determination module 611 and a drawing module 612, wherein the drawing determination module 611 is configured to determine whether a request for drawing the interface information is received; the drawing module 612 is configured to display an interface for drawing the interface information, and control a tool for drawing the interface information to draw the interface information on the interface for drawing the interface information, if the request for drawing the interface information is received; and the download module 607 is further configured to display a download interface for the interface information provided by the server, and send the request for downloading interface information to the server, if the request for drawing the interface information is not received.

Preferably, the replacing module 610 is further configured to replace the application interface of the electronic cigarette with the drawn interface information when receiving the request for replacing the application interface of the electronic cigarette.

Preferably, the drawing module 612 is further configured to store the drawn interface information into a memory of the electronic cigarette, or upload the drawn interface information to the server for storing.

By receiving a mode switching request after starting up a system, displaying a network configuration interface based on the received mode switching request, acquiring a network address of a server when the electronic cigarette is connected to a network, accessing the server based on the acquired network address of the server automatically, sending a request for downloading interface information to the server, receiving the interface information from the server based on the request for downloading interface information, and replacing the application interface of the electronic cigarette with the interface information when receiving a request for replacing the application interface of the electronic cigarette, the device in this example can personalize the application interface of the electronic cigarette as required, so as to achieve the entertainment and enjoyment of the electronic cigarette better, to meet user needs.

Figure 7:
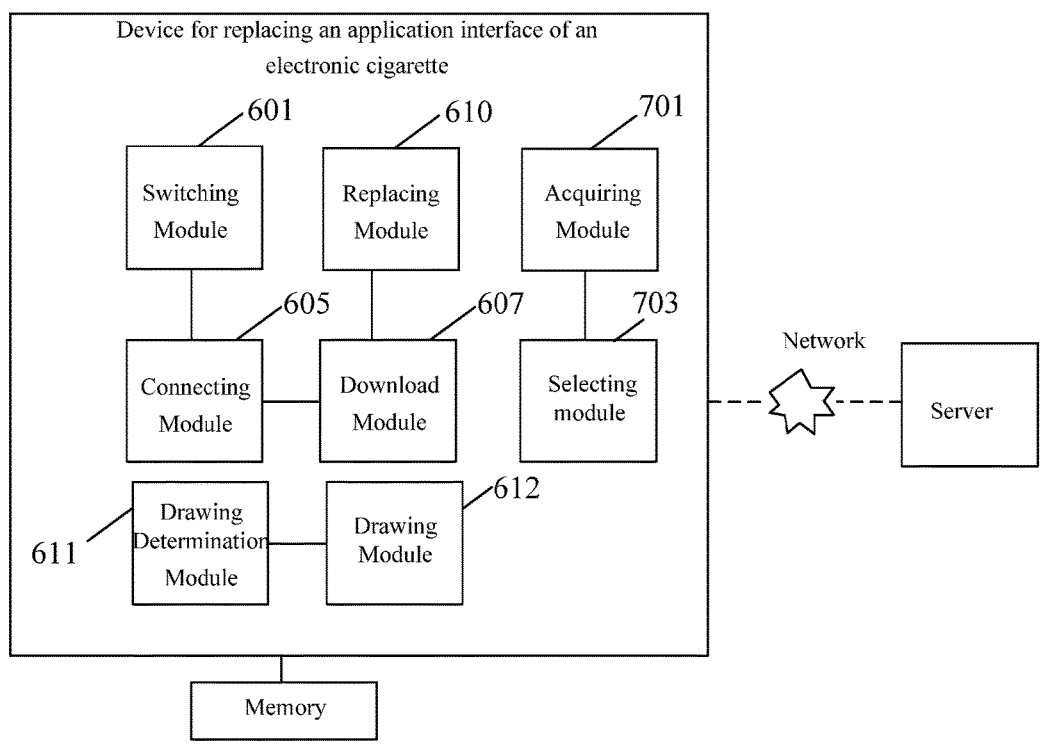
FIG. 7 is a structure diagram illustrating a device for replacing an application interface of an electronic cigarette according to Example Four of the present disclosure.

FIG. 7 is a structure diagram illustrating a device for replacing an application interface of an electronic cigarette according to Example Four of the present disclosure. The device in FIG. 7 is different from the device in FIG. 6 that the device in FIG. 7 further includes an acquiring module 701 and a selecting module 703.

The acquiring module 701 is configured to receive a request for acquiring a local interface information, and display an interface about the local interface information based on the received request for acquiring the local interface information; the selecting module 703 is configured to select the local interface information; and the replacing module 610 is further configured to replay an mode interface of the electronic cigarette with the selected local interface information.

By receiving a request for acquiring local interface information, and displaying an interface about the local interface information based on the received request for acquiring the local interface information, selecting the local interface information, and replacing an mode interface of the electronic cigarette with the selected local interface information, the device in this example can replace the mode interface with the local interface information, to further meet user needs.

An electronic cigarette is also provided in the present disclosure. The electronic cigarette include the device provide in the Example Three or Four.

The above are preferred embodiments of the present disclosure described in detail, and should not be deemed as limitations to the scope of the present disclosure. It should be noted that variations and improvements will become apparent to those skilled in the art to which the present disclosure pertains without departing from its spirit and scope. Therefore, the scope of the present disclosure is defined by the appended claims.

What is claimed is:

1. A method for replacing an application interface of an electronic cigarette, comprising:
   receiving a mode switching request issued by the electronic cigarette after starting up the electronic cigarette, and displaying a network configuration interface based on the received mode switching request;
   acquiring a network address of a server in response to the electronic cigarette being connected to a network, and accessing the server based on the acquired network address of the server automatically;
   sending a request for downloading interface information to the server, and receiving the interface information from the server based on the request for downloading interface information; and
   replacing the application interface of the electronic cigarette with the interface information in response to receiving a request for replacing the application interface of the electronic cigarette.

2. The method according to claim 1, wherein the step of sending the request for downloading interface information to the server comprises:
   determining whether a request for drawing the interface information is received;
   displaying an interface for drawing the interface information, and controlling a tool for drawing the interface information to draw the interface information on the interface for drawing the interface information in response to receiving the request for drawing the interface information; and
   displaying a download interface for the interface information provided by the server; and sending the request for downloading interface information to the server in response to not receiving the request for drawing the interface information.

3. The method according to claim 2, further comprising:
replacing the application interface of the electronic cigarette with the drawn interface information when receiving the request for replacing the application interface of the electronic cigarette.

4. The method according to claim 2, wherein controlling the tool for drawing the interface information to draw the interface information on the interface for drawing the interface information comprises:
storing the drawn interface information into a memory of the electronic cigarette; or
uploading the drawn interface information to the server for storing.

5. The method according to claim 1, further comprising:
receiving a request for acquiring local interface information, and displaying an interface about the local interface information based on the received request for acquiring the local interface information;
selecting the local interface information; and
replacing a mode interface of the electronic cigarette with the selected local interface information.

6. The method according to claim 1, wherein the interface information comprises images, backgrounds, and subjects.

7. A device for replacing an application interface of an electronic cigarette, comprising:
a controller configured to:
receive a mode switching request issued by the electronic cigarette after starting up the electronic cigarette, and display a network configuration interface based on the received mode switching request;
acquire a network address of a server in response to the electronic cigarette is-being connected to a network, and access the server based on the acquired network address of the server automatically;
send a request for downloading interface information to the server, and receive the interface information from the server based on the request for downloading interface information; and
replace the application interface of the electronic cigarette with the interface information in response to receiving a request for replacing the application interface of the electronic cigarette.

8. The device according to claim 7, wherein the controller is further configured to:
determine whether a request for drawing the interface information is received; and
display an interface for drawing the interface information, and control a tool for drawing the interface information to draw the interface information on the interface for drawing the interface information, if the request for drawing the interface information is received,
wherein the controller is further configured to display a download interface for the interface information provided by the server, and send the request for downloading interface information to the server, if the request for drawing the interface information is not received.

9. The device according to claim 8, wherein the controller is further configured to replace the application interface of the electronic cigarette with the drawn interface information in response to receiving the request for replacing the application interface of the electronic cigarette.

10. The device according to claim 8, wherein the controller is further configured to store the drawn interface information into a memory of the electronic cigarette, or upload the drawn interface information to the server for storing.

11. The device according to claim 7, the controller is further configured to:
receive a request for acquiring local interface information, and display an interface about the local interface information based on the received request for acquiring the local interface information; and
select the local interface information, wherein the controller is further configured to replace a mode interface of the electronic cigarette with the selected local interface information.

12. The device according to claim 7, wherein the interface information includes images, backgrounds and subjects.

13. An electronic cigarette, comprising:
a memory; and
a controller configured to:
receive a mode switching request issued by the electronic cigarette after starting up the electronic cigarette, and display a network configuration interface based on the received mode switching request;
acquire a network address of a server in response to the electronic cigarette being connected to a network, and access the server based on the acquired network address of the server automatically;
send a request for downloading interface information to the server, receive the interface information from the server based on the request for downloading interface information, and store the received interface information in the memory; and
replace the application interface of the electronic cigarette with the interface information in response to receiving a request for replacing the application interface of the electronic cigarette.

14. The electronic cigarette according to claim 13, wherein the controller is further configured to:
determine whether a request for drawing the interface information is received; and
display an interface for drawing the interface information, and control a tool for drawing the interface information to draw the interface information on the interface for drawing the interface information, if the request for drawing the interface information is received,
wherein the controller is further configured to display a download interface for the interface information provided by the server, and send the request for downloading interface information to the server, if the request for drawing the interface information is not received.

15. The electronic cigarette according to claim 14, wherein the controller is further configured to replace the application interface of the electronic cigarette with the drawn interface information in response to receiving the request for replacing the application interface of the electronic cigarette.

16. The electronic cigarette according to claim 14, wherein the controller is further configured to store the drawn interface information into a memory of the electronic cigarette, or upload the drawn interface information to the server for storing.

17. The electronic cigarette according to claim 13, the controller is further configured to:
receive a request for acquiring local interface information, and display an interface about the local interface information based on the received request for acquiring the local interface information; and
select the local interface information, wherein the controller is further configured to replace a mode interface of the electronic cigarette with the selected local interface information.

18. The electronic cigarette according to claim 13, wherein the interface information includes images, backgrounds and subjects.

* * * * *